(12) United States Patent
Fink (10) Patent No.: US 8,818,423 B2
(45) Date of Patent: Aug. 26, 2014

(54) METHODS FOR SHARING ATHLETIC ACTIVITIES

(76) Inventor: Ryan Fink, Vancouver, WA (US)

( * ) Notice: Subject to any disclaimer, the term of this patent is extended or adjusted under 35 U.S.C. 154(b) by 335 days.

(21) Appl. No.: 13/524,942

(22) Filed: Jun. 15, 2012

(65) Prior Publication Data

US 2013/0337828 A1    Dec. 19, 2013

(51) Int. Cl.
*H04W 24/00* (2009.01)
(52) U.S. Cl.
USPC ............................. 455/457; 715/772; 482/8
(58) Field of Classification Search
USPC ................................... 455/456.1–457; 482/8
See application file for complete search history.

(56) References Cited

U.S. PATENT DOCUMENTS

| | | | | |
|---|---|---|---|---|
| 7,292,151 | B2 * | 11/2007 | Ferguson et al. | 340/573.1 |
| 8,078,478 | B2 * | 12/2011 | Fleming et al. | 705/1.1 |
| 8,446,275 | B2 * | 5/2013 | Utter, II | 340/539.12 |
| 8,533,620 | B2 * | 9/2013 | Hoffman et al. | 715/772 |
| 2007/0219059 | A1 * | 9/2007 | Schwartz et al. | 482/8 |
| 2012/0041767 | A1 * | 2/2012 | Hoffman et al. | 705/1.1 |
| 2013/0083009 | A1 * | 4/2013 | Geisner et al. | 345/419 |
| 2014/0067494 | A1 * | 3/2014 | Squires | 705/14.1 |

* cited by examiner

*Primary Examiner* — Sharad Rampuria
(74) *Attorney, Agent, or Firm* — Mohr Intellectual Property Law Solutions, PC (57) ABSTRACT

Methods for sharing athletic activities and systems incorporating the same, wherein some examples include receiving challenger data corresponding to a challenge initiated by challengers, communicating challenger data to challenge record servers, comparing challenger data to owner records to determine if challengers were victorious, and requesting challenge record servers to overwrite owner records if the challengers were victorious. Other examples may additionally or alternatively include storing on challenge record servers one or more server challenge datasets including owner records, receiving challenger data corresponding to challenges completed by challengers, comparing owner records to the challenger data to determine if the challengers were victorious, and overwriting the owner record if the challengers were victorious. Other examples may additionally or alternatively include receiving selected geographic regions, communicating the selected geographic regions to challenge record servers, and receiving from the challenge record servers owner records proximate the selected geographic regions.

18 Claims, 8 Drawing Sheets

METHODS FOR SHARING ATHLETIC ACTIVITIES

BACKGROUND

The present disclosure relates generally to methods for sharing athletic activity information and systems implementing the same. In particular, this disclosure discusses personal training and fitness tracking methods and systems on mobile electronic devices and other related hardware.

Known personal training and fitness tracking systems are not entirely satisfactory for the range of applications in which they are employed. For example, many conventional systems do not adequately share results with friends and/or the public. While many conventional systems allow the logging of data related athletic activities and uploading that data to a server, many fail to provide meaningful community-sharing features. Providing the public and friends with the opportunity to "beat" locally posted "challenges" serves as great motivation to spur athletic activity: users may compare their results with others shared in his community to accurately compare the user's level of success on the challenge. Conventional systems' lack of such community features leaves these systems with plenty of room for improvement as both a motivational tool and tracking system. Further, they lack the entertainment value associated with challenge-based competitions.

Further, many conventional systems require the user to access and view separate devices (such as a mobile phone) to view athletic training data. This may require the user to turn away from his path as a result. This is inconvenient at best, and could even result in injury. Therefore, systems and methods that allow users to persistently view updated navigational information and training data while training (particularly with respect to data related to the challenges discussed above) are needed. For example, eyewear capable of displaying computer generated images may be particularly useful in providing such a persistent view; many conventional systems do not implement such hardware.

Further, many existing systems rely largely on symbolic maps to illustrate navigational information. While map-based navigation is effective, purely symbolic representations often imprecisely communicate real world locations, as they often lack an adequate visual representation of displayed locations. Currently lacking is means to display navigational graphics overlaid in user's current field of vision to more precisely and in a less obstructed manner display such navigational information (such as with the aforementioned eyewear, for example).

Thus, there exists a need for methods for sharing athletic activities that improve upon and advance the design of known athletic training logging systems and devices. Examples of new and useful methods for sharing athletic activity information relevant to the needs existing in the field are discussed below.

Disclosure addressing one or more of the identified existing needs is provided in the detailed description below. Examples of references relevant to the disclosure provided below include the following pending U.S. Patent Applications that share common ownership with the disclosed inventions: U.S. patent application Ser. No. 12/869,481, U.S. patent application Ser. No. 13/329,118, and U.S. patent application Ser. No. 13/175,816. The complete disclosures of the above patent applications are herein incorporated by reference for all purposes.

SUMMARY

The present disclosure is directed to methods for sharing athletic activity information and systems incorporating the same, wherein some examples include receiving challenger data corresponding to a challenge initiated by challengers, communicating challenger data to challenge record servers, comparing challenger data to owner records to determine if challengers were victorious, and requesting challenge record servers to overwrite owner records if the challengers were victorious. Other examples may additionally or alternatively include storing on challenge record servers one or more server challenge datasets including owner records, receiving challenger data corresponding to challenges completed by challengers, comparing owner records to the challenger data to determine if the challengers were victorious, and overwriting the owner record if the challengers were victorious. Other examples may additionally or alternatively include receiving selected geographic regions, communicating the selected geographic regions to challenge record servers, and receiving from the challenge record servers owner records proximate the selected geographic regions.

DETAILED DESCRIPTION

The disclosed methods will become better understood through review of the following detailed description in conjunction with the figures. The detailed description and figures provide mere examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various methods are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Various disclosed examples may be implemented using electronic circuitry configured to perform one or more functions. For example, with some embodiments of the invention, the disclosed examples may be implemented using one or more application-specific integrated circuits (ASICs). More typically, however, components of various examples of the invention will be implemented using a programmable computing device executing firmware or software instructions, or by some combination of purpose-specific electronic circuitry and firmware or software instructions executing on a programmable computing device.

Figure 1:
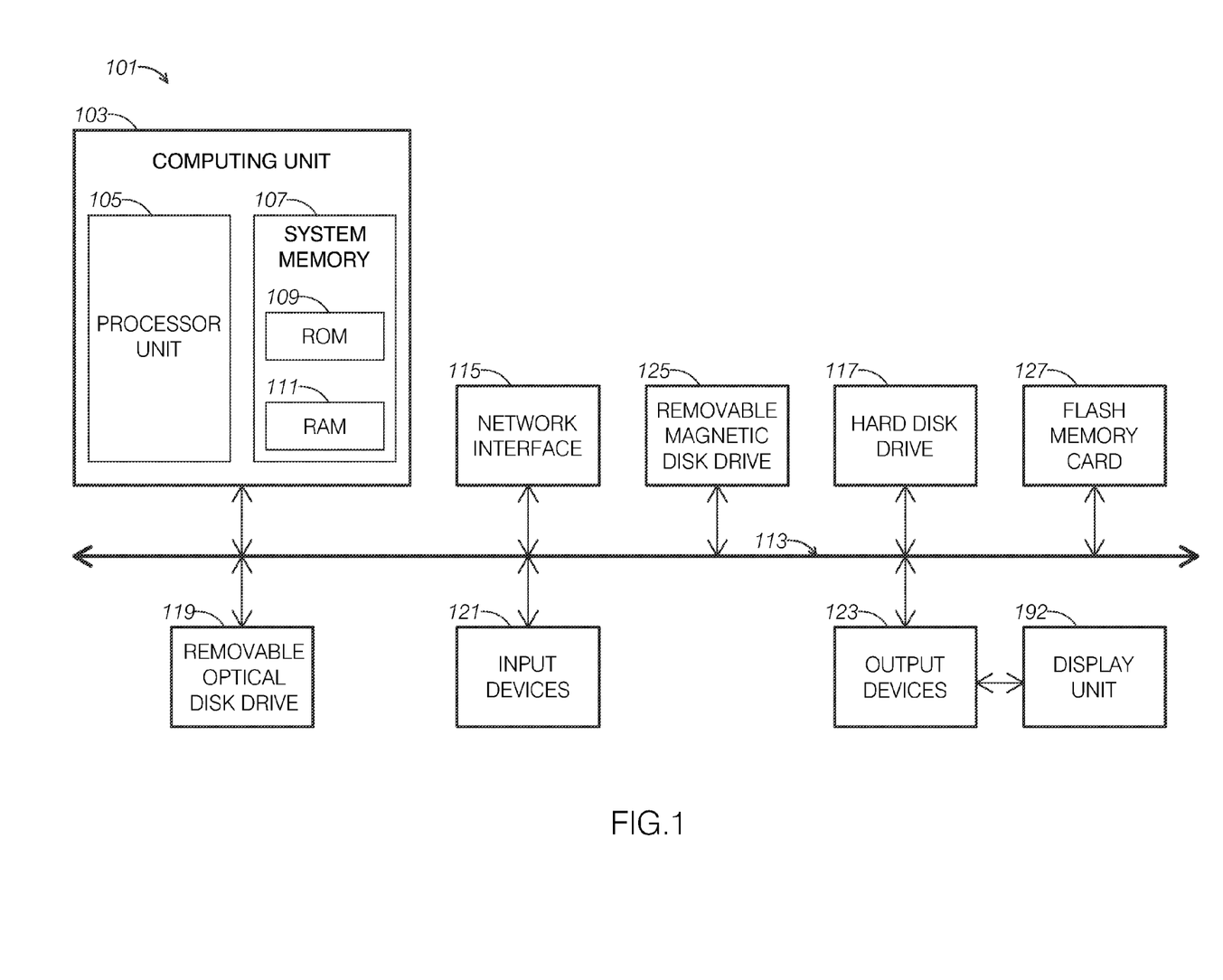
FIG. 1 shows a schematic of an example of a programmable computing device.

Accordingly, FIG. 1 shows one illustrative example of a computer 101 that can be used to implement various embodiments of the invention. Computer 101 may be incorporated within a variety of consumer electronic devices, such as personal media players, cellular phones, smart phones, personal data assistants, global positioning system devices, and the like.

As seen in this figure, computer 101 has a computing unit 103. Computing unit 103 typically includes a processing unit 105 and a system memory 107. Processing unit 105 may be any type of processing device for executing software instructions, but will conventionally be a microprocessor device. System memory 107 may include both a read-only memory (ROM) 109 and a random access memory (RAM) 111. As will be appreciated by those of ordinary skill in the art, both read-only memory (ROM) 109 and random access memory (RAM) 111 may store software instructions to be executed by processing unit 105.

Processing unit 105 and system memory 107 are connected, either directly or indirectly, through a bus 113 or alternate communication structure to one or more peripheral devices. For example, processing unit 105 or system memory 107 may be directly or indirectly connected to additional memory storage, such as a hard disk drive 117, a removable optical disk drive 119, a removable magnetic disk drive 125, and a flash memory card 127. Processing unit 105 and system memory 107 also may be directly or indirectly connected to one or more input devices 121 and one or more output devices 123. Input devices 121 may include, for example, a keyboard, touch screen, a remote control pad, a pointing device such as a mouse, touchpad, stylus, trackball, or joystick), a scanner, a camera or a microphone. Output devices 123 may include, for example, a monitor display, an integrated display, television, printer, stereo, or speakers.

Still further, computing unit 103 will be directly or indirectly connected to one or more network interfaces 115 for communicating with a network. This type of network interface 115, also sometimes referred to as a network adapter or network interface card (NIC), translates data and control signals from computing unit 103 into network messages according to one or more communication protocols, such as the Transmission Control Protocol (TCP), the Internet Protocol (IP), and the User Datagram Protocol (UDP). These protocols are well known in the art, and thus will not be discussed here in more detail. An interface 115 may employ any suitable connection agent for connecting to a network, including, for example, a wireless transceiver, a power line adapter, a modem, or an Ethernet connection.

It should be appreciated that, in addition to the input, output and storage peripheral devices specifically listed above, the computing device may be connected to a variety of other peripheral devices, including some that may perform input, output and storage functions, or some combination thereof. For example, the computer 101 may be connected to a digital music player, such as an IPOD® brand digital music player or iOS or Android based smartphone. As known in the art, this type of digital music player can serve as both an output device for a computer (e.g., outputting music from a sound file or pictures from an image file) and a storage device.

In addition to a digital music player, computer 101 may be connected to or otherwise include one or more other peripheral devices, such as a telephone. The telephone may be, for example, a wireless "smart phone," such as those featuring the Android or iOS operating systems. As known in the art, this type of telephone communicates through a wireless network using radio frequency transmissions. In addition to simple communication functionality, a "smart phone" may also provide a user with one or more data management functions, such as sending, receiving and viewing electronic messages (e.g., electronic mail messages, SMS text messages, etc.), recording or playing back sound files, recording or playing back image files (e.g., still picture or moving video image files), viewing and editing files with text (e.g., Microsoft Word or Excel files, or Adobe Acrobat files), etc. Because of the data management capability of this type of telephone, a user may connect the telephone with computer 101 so that their data maintained may be synchronized.

Of course, still other peripheral devices may be included with or otherwise connected to a computer 101 of the type illustrated in FIG. 1, as is well known in the art. In some cases, a peripheral device may be permanently or semi-permanently connected to computing unit 103. For example, with many computers, computing unit 103, hard disk drive 117, removable optical disk drive 119 and a display are semi-permanently encased in a single housing.

Still other peripheral devices may be removably connected to computer 101, however. Computer 101 may include, for example, one or more communication ports through which a peripheral device can be connected to computing unit 103 (either directly or indirectly through bus 113). These communication ports may thus include a parallel bus port or a serial bus port, such as a serial bus port using the Universal Serial Bus (USB) standard or the IEEE 1394 High Speed Serial Bus standard (e.g., a Firewire port). Alternately or additionally, computer 101 may include a wireless data "port," such as a Bluetooth® interface, a Wi-Fi interface, an infrared data port, or the like.

It should be appreciated that a computing device employed according various examples of the invention may include more components than computer 101 illustrated in FIG. 1, fewer components than computer 101, or a different combination of components than computer 101. Some implementations of the invention, for example, may employ one or more computing devices that are intended to have a very specific functionality, such as a digital music player or server computer. These computing devices may thus omit unnecessary peripherals, such as the network interface 115, removable optical disk drive 119, printers, scanners, external hard drives, etc. Some implementations of the invention may alternately or additionally employ computing devices that are intended to be capable of a wide variety of functions, such as a desktop or laptop personal computer. These computing devices may have any combination of peripheral devices or additional components as desired.

Figure 2:
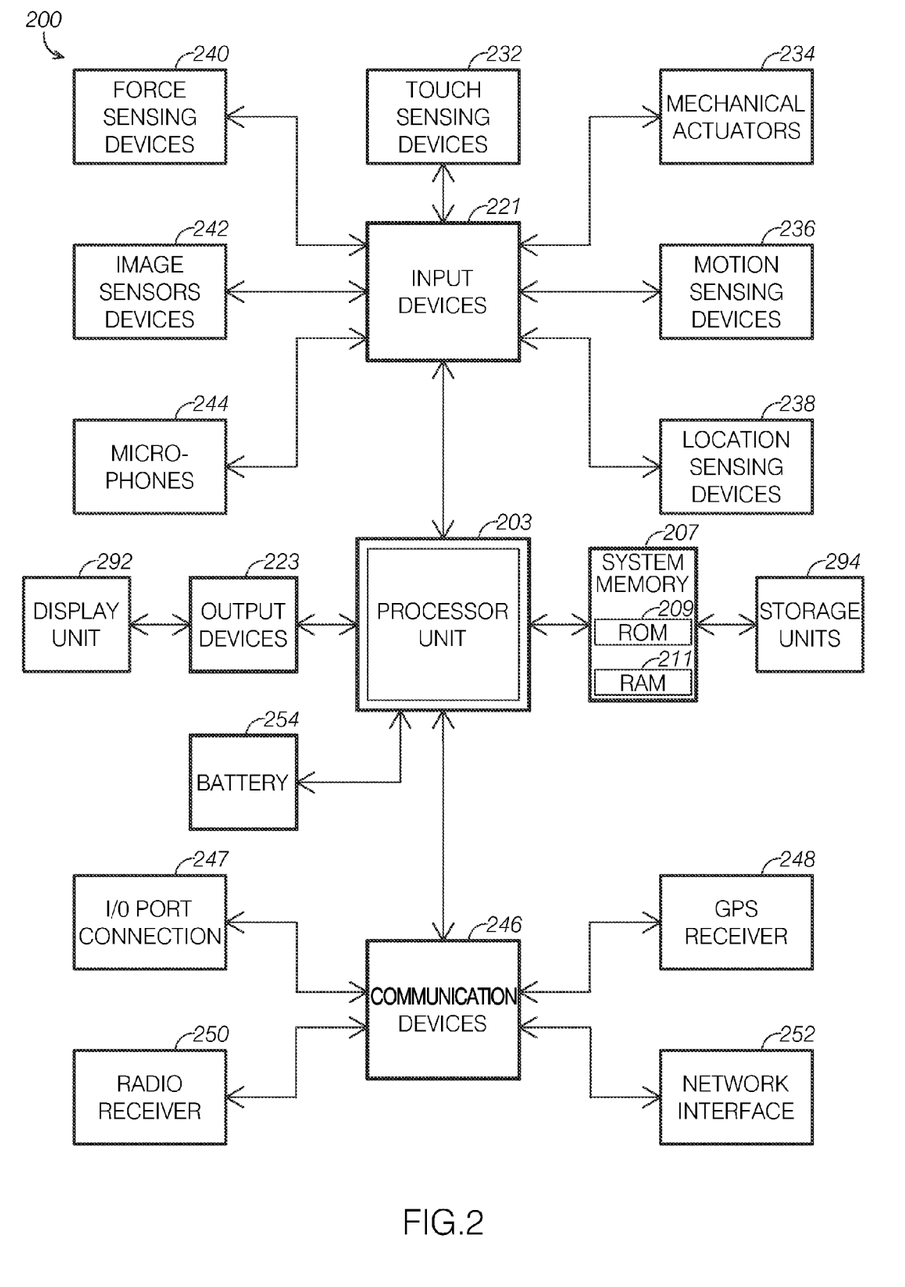
FIG. 2 shows a schematic view of an example of a mobile electronic device.

In many examples, computing devices may define mobile electronic devices, such as smartphones, tablet computers, or portable music players, often operating the iOS, Symbian, Windows-based (including Windows Mobile and Windows 8), or Android operating systems. FIG. 2 illustrates an exemplary mobile device, mobile device 200, that includes a processor unit 203 (e.g., CPU) configured to execute instructions and to carry out operations associated with the mobile device. For example, using instructions retrieved for example from memory, the controller may control the reception and manipulation of input and output data between components of the mobile device. The controller can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc.

In most cases, the controller together with an operating system operates to execute computer code and produce and use data. The operating system may correspond to well known operating systems such iOS, Symbian, Windows-based (including Windows Mobile and Windows 8), or Android operating systems, or alternatively to special purpose operating system, such as those used for limited purpose appliance-type devices. The operating system, other computer code and data may reside within a system memory 207 that is operatively coupled to the controller. System memory 207 generally provides a place to store computer code and data that are used by the mobile device. By way of example, system memory 207 may include read-only memory (ROM) 209, random-access memory (RAM) 211. Further, system memory 207 may retrieve data from storage units 294, which may include a hard disk drive, flash memory, etc. In conjunction with system memory 207, storage units 294 may include a removable storage device such as an optical disc player that receives and plays DVDs, or card slots for receiving mediums such as memory cards (or memory sticks).

Mobile device 200 also includes input devices 221 that are operatively coupled to processor unit 203. Input devices 221 are configured to transfer data from the outside world into mobile device 200. As shown, input devices 221 may correspond to both data entry mechanisms and data capture mechanisms. In particular, input devices 221 may include touch sensing devices 232 such as touch screens, touch pads and touch sensing surfaces, mechanical actuators 234 such as button or wheels or hold switches, motion sensing devices 236 such as accelerometers, location detecting devices 238 such as global positioning satellite receivers, WiFi based location detection functionality, or cellular radio based location detection functionality, force sensing devices such as force sensitive displays and housings, image sensors, and microphones. Input devices 221 may also include a clickable display actuator.

Mobile device 200 also includes various output devices 223 that are operatively coupled to processor unit 203. Output devices 233 are configured to transfer data from mobile device 200 to the outside world. Output devices 233 may include a display unit 292 such as an LCD, speakers or jacks, audio/tactile feedback devices, light indicators, and the like.

Mobile device 200 also includes various communication devices 246 that are operatively coupled to the controller. Communication devices 246 may, for example, include both an I/O port connection 247 that may be wired or wirelessly connected to selected I/O ports such as IR, USB, or Firewire ports, a global positioning satellite receiver 248, and a radio receiver 250 which may be configured to communicate over wireless phone and data connections. Communication devices 246 may also include a network interface 252 configured to communicate with a computer network through various means which may include wireless connectivity to a local wireless network, a wireless data connection to a cellular data network, a wired connection to a local or wide area computer network, or other suitable means for transmitting data over a computer network.

Mobile device 200 also includes a battery 254 and possibly a charging system. Battery 254 may be charged through a transformer and power cord or through a host device or through a docking station. In the cases of the docking station, the charging may be transmitted through electrical ports or possibly through an inductance charging means that does not require a physical electrical connection to be made.

The various aspects, features, embodiments or implementations of the invention described above can be used alone or in various combinations. The methods of this invention can be implemented by software, hardware or a combination of hardware and software. The invention can also be embodied as computer readable code on a computer readable medium. The computer readable medium is any data storage device that can store data which can thereafter be read by a computer system, including both transfer and non-transfer devices as defined above. Examples of the computer readable medium include read-only memory, random access memory, CD-ROMs, flash memory cards, DVDs, magnetic tape, optical data storage devices, and carrier waves. The computer readable medium can also be distributed over network-coupled computer systems so that the computer readable code is stored and executed in a distributed fashion.

This disclosure discusses several methods for improved sharing of athletic activities on computing devices. Several of the disclosed methods include features that enable users, or "challengers," to use client mobile electronic devices to log "challenges" corresponding to athletic endeavors and communicate records of these challenges to servers. In some cases, challengers may "drop" new challenges, whereby the challenger uploads to a server a record corresponding to a challenge created by the "challenger." Typically, but not necessarily, the dropped challenge may correspond to a challenge recently completed by the challenger.

In other cases, however, challengers may drop attempts on existing challenges hosted by the server. Typically, such hosted challenges define an "owner," a separate challenger who was deemed to have most satisfactorily completed the challenge. In many cases, this may mean that the owner completed the challenge in the least amount of time, but other grounds of victory may be dictated by particular challenges. When a challenger drops an attempt on an existing challenge, the challenger may be deemed "victorious" if he betters the "owner" of the challenge.

Challenges may include any of a wide range of athletic activities. In some examples, challenges may define running races from first location to second locations. Challenges need not involve running, however, and other types of challenges are considered. For example, other timed activities, such as cycling, are equally within this disclosure.

Further, non-timed events, such as those based on total distance, are also considered. Activities based on other criteria, such as golf, bowling, or other such games, may also serve as the basis for challenges. Although the disclosed methods are compatible with a variety of activities, the foregoing disclosure primarily discusses example challenges defining a simple timed running race from a first location to a second location for simplicity and clarity.

Several examples of the disclosed methods are assisted by the use of a set of common features. For example, many examples of the disclosed methods are assisted by a challenge record server, such as challenge record server 300 illustrated in FIG. 3. Challenge record server 300 typically includes one or more databases hosted on one or more computing devices. Challenge record server 300 server acts as a central repository for all of challenge records associated with "dropped" challenges.

Figure 3:
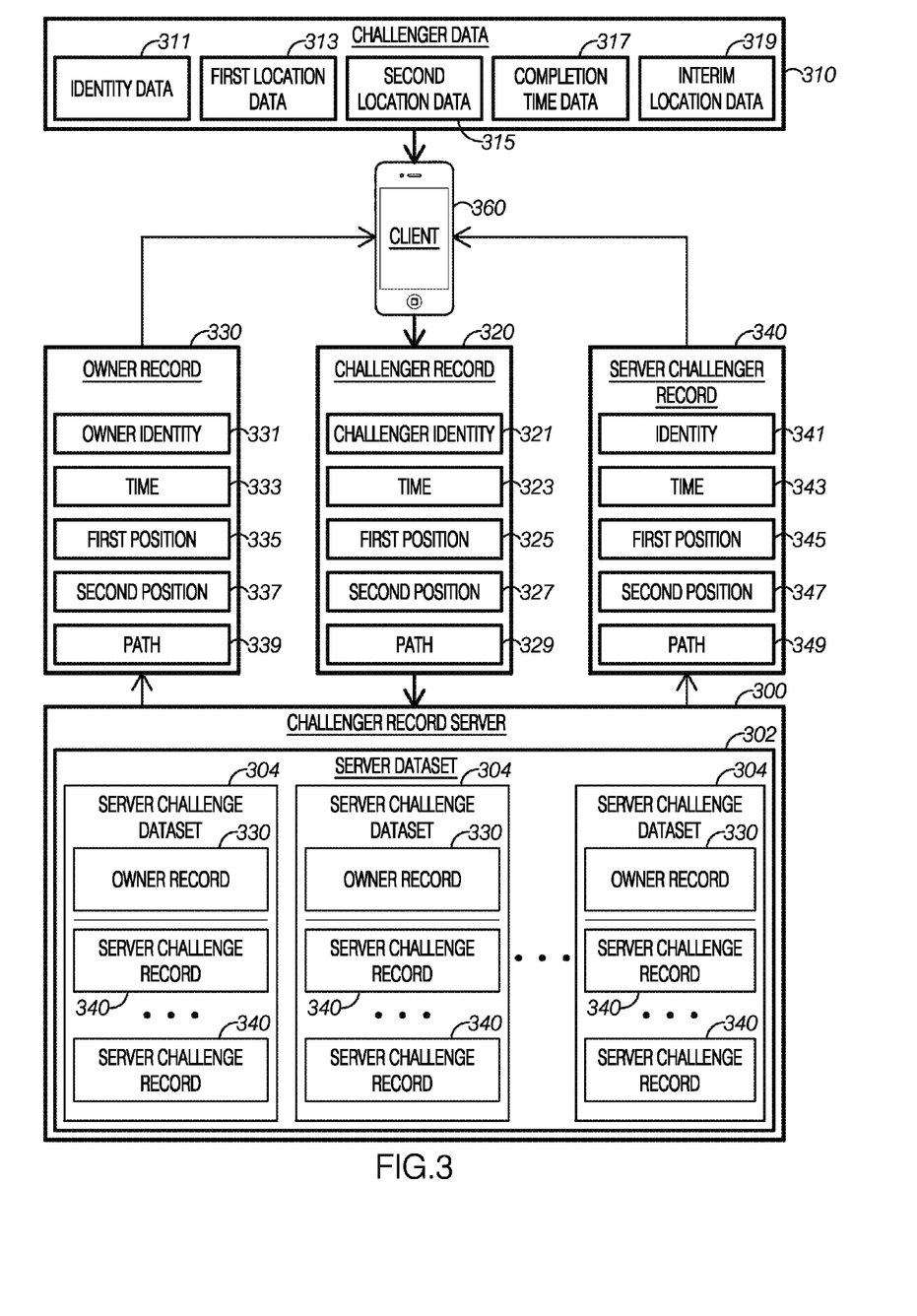
FIG. 3 shows a diagrammatic view of data hosted by a challenge record server and the communication between a client operating in a challenger mode, the challenge record server, and a client operating in a potential challenger client mode.

FIG. 3 illustrates the data stored by challenge record server 300 and the data that challenge record server 300 communicates with in example client mobile electronic device 360. As FIG. 3 illustrates, challenge record server 300 includes a server dataset 302 including a plurality of server challenge datasets 304. Server dataset 302 stores data corresponding to completed challenges, often received from challengers via client mobile electronic devices. Server dataset 302 may additionally or alternatively include records inserted manually or by other suitable means. This allows challenge record server 300's operator to manually create challenges, such as third-party sponsored challenges.

As FIG. 3 illustrates, each server challenge dataset 304 includes one or more challenge records, including: one owner record 330 and one or more additional server challenge records 340. Each server challenge dataset 304 includes indexed and stored data corresponding to a particular challenge. For example, when client mobile electronic device 360 communicates a challenge record, such as challenger record 320, to challenge record server 300, challenge record server 300 may select the appropriate server challenge dataset 304 and insert the received data.

As FIG. 3 illustrates, the present disclosure identifies three non-exclusive examples of challenge records, including: challenger records 320, owner records 330, and server challenge records 340. As FIG. 3 illustrates, each example challenge record includes substantially similar information; they are referred to separately, however, to indicate their source, purpose, and/or location. This disclosure considers, however, that challenge records associated with challenge types differing from a simple timed running race may include additional or alternative data entries, such as score entries, average heart rate entries, or calories burned entries. Further, other challenge records may lack certain entries. For instance, challenge records corresponding to challenges based on total distance traveled may not include a completion time entry. In many cases, however, all challenge records associated with a particular challenge will include congruous data entries.

As FIG. 3 shows, challenger records 320 are communicated from client mobile electronic devices to challenge record server 300, typically when a challenger completes either a new challenge or attempt at an existing challenge. As FIG. 3 illustrates, each challenger record 320 includes a challenger record identity entry 321, a challenger record completion time entry 323, a challenger record first position entry 325, a challenger record second position entry 327, and a challenger record path entry 329.

Each challenger record identity entry 321 typically includes challenger identity data that distinctly identifies the challenger. The challenger identity data may, for example, include an automatically generated electronic key associated with a challenger that maintains an account with challenge record server 300.

Each challenger record first position entry 325 typically includes challenger first location data corresponding to a position near the starting point of the associated challenge. Likewise, each challenger record second position entry 327 includes challenger second location data corresponding to a second location passed during the challenge. Typically, the second location data will be near the finishing point of the associated challenge. Some examples, however, may include splits or intervals, and second locations may be associated with those splits or intervals rather than the finishing point. Location data typically corresponds to digital representations of locations produced by GPS receivers or other location sensing devices. Each challenger record path entry 329 typically includes challenger path data corresponding to the path that the user took from the first geographic location to the second geographic location. Typically, path data includes an ordered plurality of the aforementioned digital representations of locations that define points in which the challenger passed in completing the challenge.

As FIG. 3 illustrates, each owner record 330 includes an owner record identity entry 331, an owner record completion time entry 333, an owner record first position entry 335, an owner record second position entry 337, and an owner record path entry 339, each entry substantially similar to the aforementioned counterparts of the challenger record. Each owner record 330 typically denotes the challenger that most successfully completed the associated challenge and includes the data relevant to the successful attempt.

In a challenge defining a simple running race, for example, the owner record would define the lowest completion rime entry in the associated server challenge dataset. Typically, each owner record 330 is overwritten when challenge record server 300 receives challenge data corresponding to a successful attempt. When this occurs, challenge record server 300 typically saves the data in the overwritten owner record as a server challenge record within the same server challenge dataset.

As FIG. 3 shows, each server challenge record 340 includes a server challenge record identity entry 341, a server challenge record completion time entry 343, a server challenge record first position entry 335, a server challenge record second position entry 337, and a server challenge record path entry 349, each entry substantially similar to the aforementioned counterparts of the challenger record. The server challenge records 340 typically index and store data corresponding to completed challenges that did not successfully overtake the owner record. Additionally or alternatively, the server challenge records may define previously overtaken owner records.

This disclosure contemplates that some server challenge datasets may not include any server challenge records. This may occur, for example, because the challenge record server has only received one record associated with a particular challenge. Additionally or alternatively, some examples may not include server challenge records associated with unsuccessful challenge attempts to reduce storage requirements.

The data structure and flow diagrams illustrated in FIG. 3 is provided for clarity only. Embodiments of the inventive subject matter need not store and communicate data in the precise manner illustrated in FIG. 3, and many embodiments may organize the data in ways that dramatically differ from the organization shown in FIG. 3. For clarity's sake, however, many foregoing examples in this detailed description will be discussed in connection with the data stored and communicated according to the diagrams FIG. 3.

Figure 4:
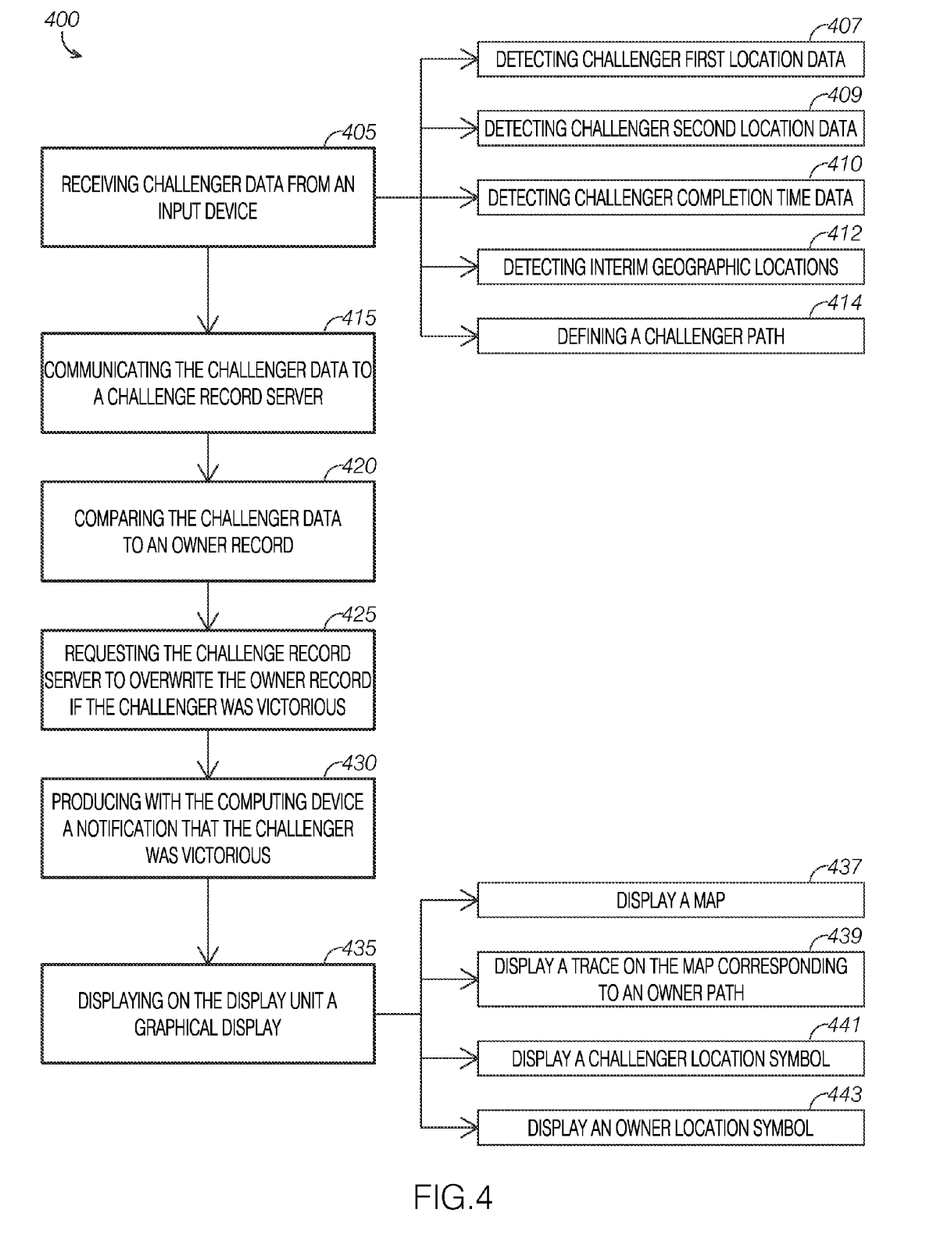
FIG. 4 is a flow diagram of a first example of a method for sharing athletic activities.

With reference to FIG. 4, a first example of a method for sharing athletic activities, method 400, will now be described. For the purposes of this discussion, method 400 will be discussed as operating as software on client mobile electronic device 360 that communicates with challenge record server 300 using challenge records. This disclosure contemplates, however, that method 400 may be performed by other capable hardware and may, in some cases, communicate with additional or alternative servers.

A challenger typically uses client mobile electronic device 360 to perform the steps of method 400 as he is participating in or has completed a challenge, including "dropping" new challenges or "dropping" attempts on existing challenges. Typical the challenger performs many of the steps of method 400 as client mobile electronic device 360 logs and communicates data corresponding to the present or recently completed challenge.

Figure 7:
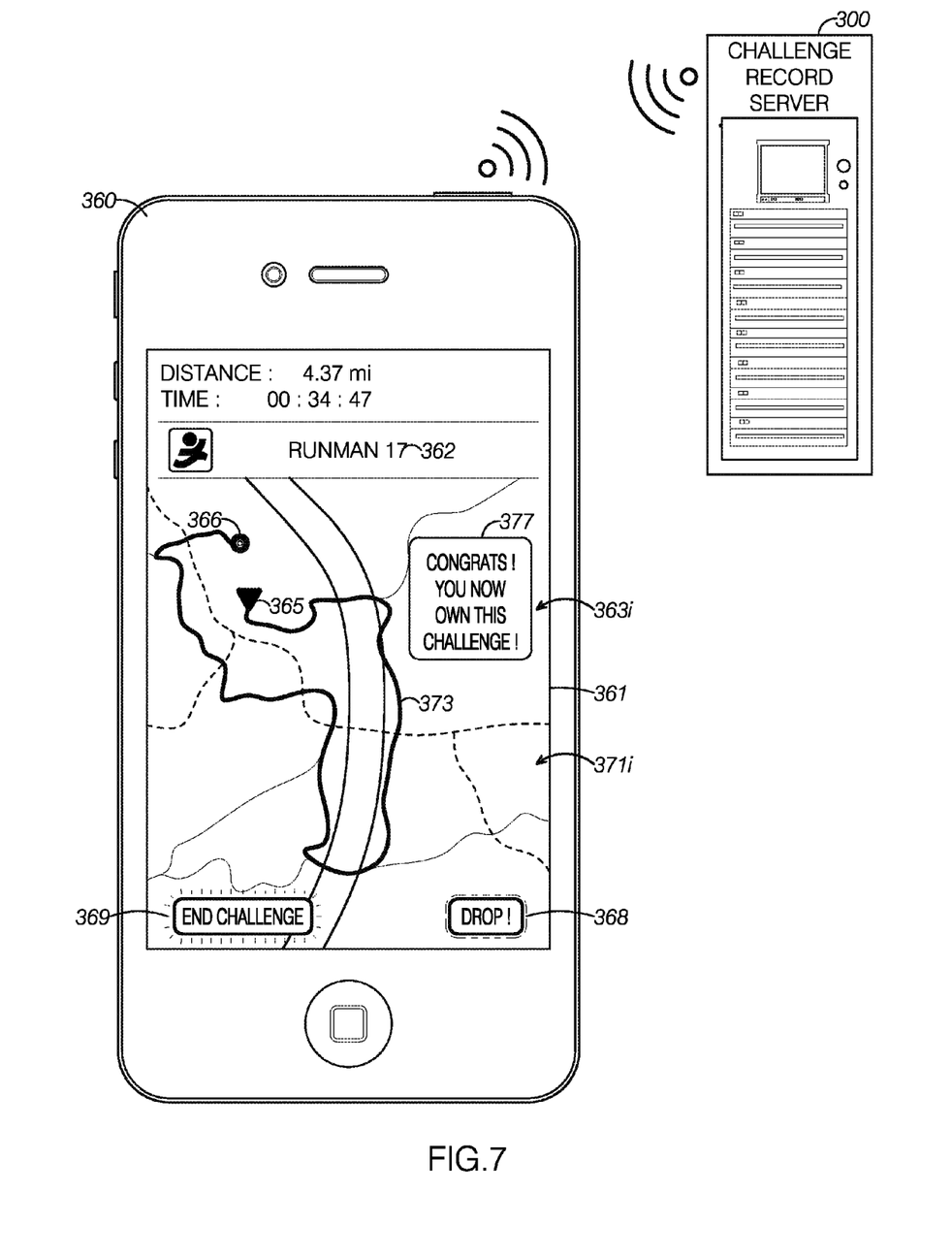
FIG. 7 shows an example of a mobile electronic device acting as a challenger client in mobile communication with a challenge record server.
Figure 8:
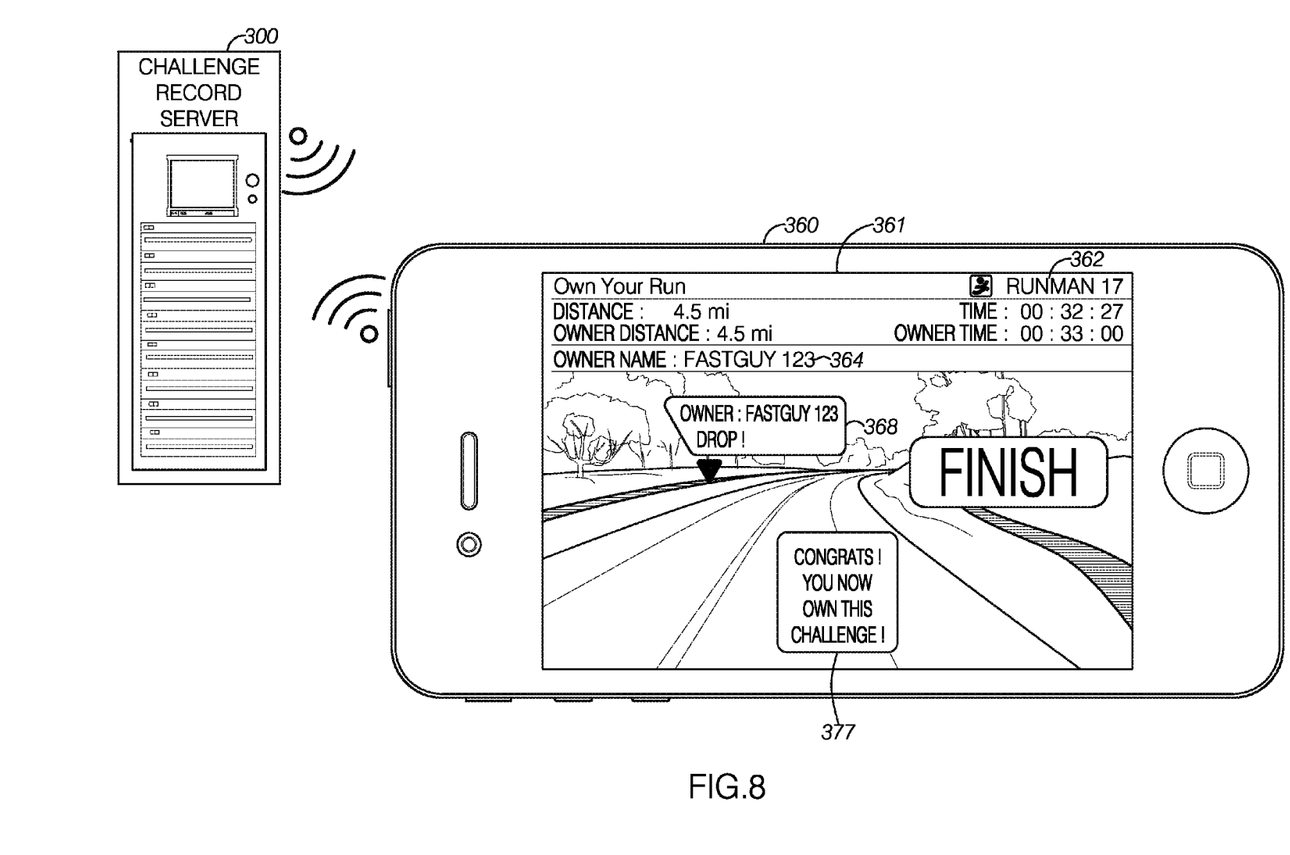
FIG. 8 shows the example of the mobile electronic device acting as a challenger client in mobile communication with the challenge record server, the mobile electronic device operating in an augmented reality configuration.
Figure 9:
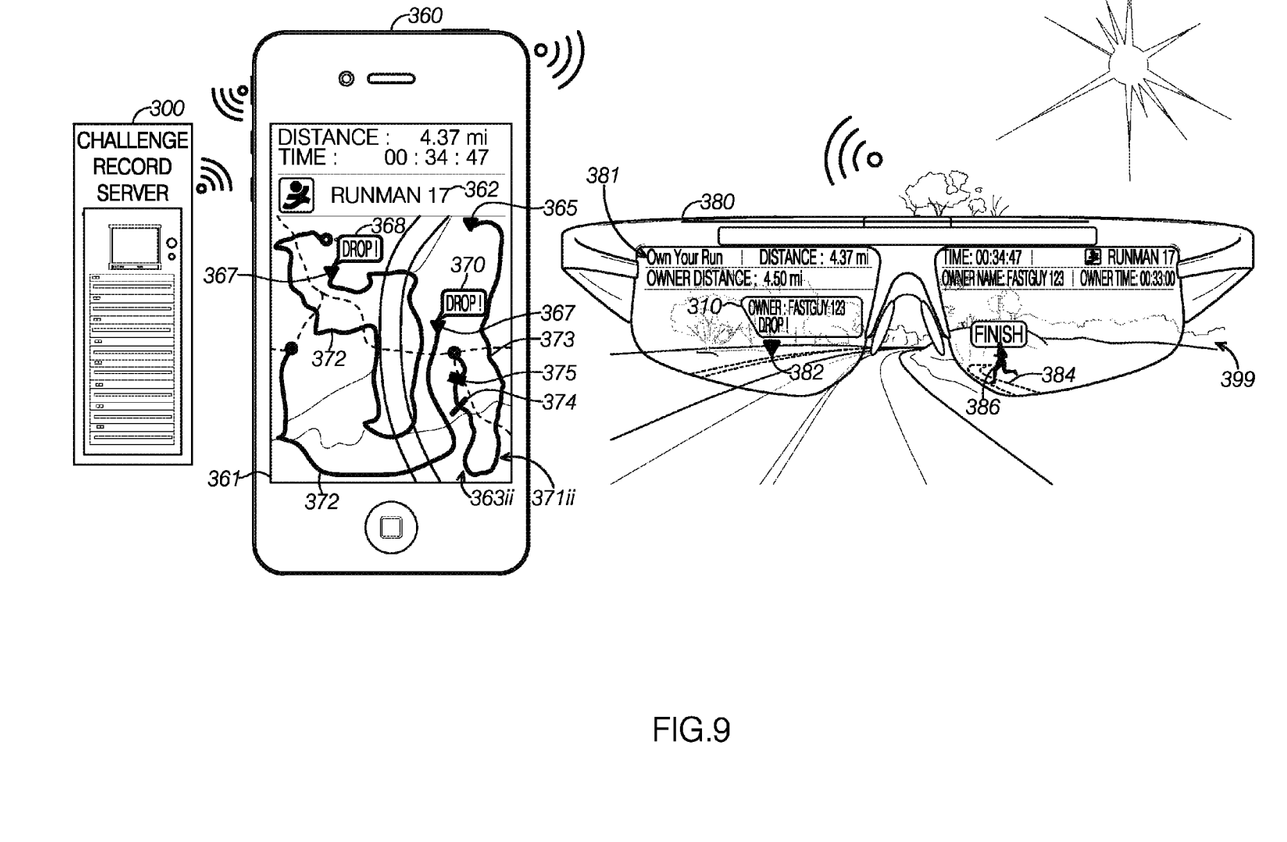
FIG. 9 shows the example of the mobile electronic device acting as a challenger client in mobile communication with the challenge record server, the mobile electronic device in data communication with an eyewear device.

FIGS. 7-9 illustrate example cases of client mobile electronic device 360 performing method 400. FIGS. 7-9 show client mobile electronic device 360 displaying on display unit 361 graphical displays, graphical display 363i and graphical display 363ii, that correspond to a challenger, challenger 362 bearing the user name "runman17," performing a challenge. Though not all are explicitly illustrated, client mobile electronic device 360 includes a set of hardware components substantially similar to mobile device 200. FIG. 7 illustrates an example where challenger 362 is "dropping" a new challenge, whereas FIGS. 8 and 9 illustrate examples where challenger 362 is "dropping" an attempt at a challenge owned by another challenger, owner 364 bearing the username "fastguy123."

As FIG. 4 illustrates, method 400 includes receiving challenger data from an input device at step 405, communicating the challenger data to a challenge record server at step 415, comparing the challenger data to an owner record at step 420, requesting the challenge record server to or the owner record if the challenger was victorious at step 425, producing a notification that the challenger was victorious at step 430, and displaying on the display unit a graphical display at step 435.

As FIG. 4 shows, challenger data is received from an input device corresponding to a user challenge initiated by a challenger at step 405. As FIG. 4 illustrates, receiving the challenger data at step 405 includes detecting challenger first location data at step 407, detecting challenger second location data at step 409, detecting challenger completion time data at step 410, detecting interim geographic locations at step 412, and defining a challenger path at step 414.

FIG. 3 illustrates an example collection of challenger data, challenger data 310. As FIG. 3 illustrates, challenger data 310 includes similar data to other challenge records, including challenger identity data 311, challenger first location data 313, challenger second location data 315, challenger completion time data 317, and challenger interim location data 319. Typically, client mobile electronic device 360 will process the challenger data to produce a challenger record 320 compatible with challenge record server 300.

As FIG. 4 shows, challenger first location data is detected with a location sensing device at step 407. The challenger first location data typically corresponds to a challenger first geographic location; the challenger first geographic location is proximate the location that challenger 362 begun the challenge. The location sensing device often defines client mobile electronic device 360's global positioning satellite receiver ("GPS receiver"). The location data includes data received by the GPS receiver that corresponds to a set of geographic coordinates.

Typically, client mobile electronic device 360 receives and stores the challenger first location data as the challenger begins a challenge. As result, client mobile electronic device 360 may process the data to provide an output for the challenger. For example, FIG. 7 illustrates a challenger first location symbol 365 corresponding to the position at which challenger 362 begun the challenge that he just completed. Often times, a challenge may be started in response to challenger input, such as a selecting challenge drop icon 368. Challenge drop icon 368 may be persistently displayed on the display unit while method 400's software is running, providing challengers the opportunity to initiate a new challenge at any time.

Although the GPS receiver is the preferred means for detecting location, other mobile device tracking technologies may be used, including network-based location tracking systems (such as cell tower triangulation) and other commonplace location sensing technologies.

As FIG. 4 shows, challenger second location data, spaced from the first, is detected with the location sensing device at step 409. Typically, the challenger second location data received substantially similarly to the challenger first location data. Upon completing a challenge, method 400's software may process the challenger second location data.

For example, FIG. 7 illustrates a challenger second location symbol 366 corresponding to the challenger second geographic location. Often times, challengers may determine when a challenge has been completed and that second location data may be received. Often times, this may involve a user selecting an icon, such as end challenge icon 369. In some circumstances, such as those when the second location defines a lap or interval time, client mobile electronic device 360 may continue recording challenge data after receiving the challenger second location data.

As FIG. 4 shows, challenger completion time data is received from a timekeeping unit at step 410. The completion time data corresponds to the time that elapsed as the challenger traveled from the first geographic location to the second geographic location. Typically, the timekeeping unit defines client mobile electronic device 360's clock or stopwatch (though other equivalent timekeeping technologies equally considered, such as GPS-received time logging).

Receiving completion time data typically includes two steps: recording a beginning time when the user begins a challenge and recording an ending time when the user ends the challenge. The completion time data reflects difference between these two times. Although the completion time data is typically the only time data that is stored as a part of the challenger data, the beginning time and the ending time may be stored in the challenge data as well. Recording the beginning time and/or ending time may be useful, for example, in recording challenges that require subsequent attempts to be completed during a particular time of day or during a selected span of time.

As FIG. 4 illustrates, interim geographic locations are detected with the location sensing device at step 412. Client mobile electronic device 360 records interim geographic locations at one or more positions between the challenger first geographic location and the challenger second geographic location as the challenger travels between them in completing a challenge.

As FIG. 4 shows, a challenger path is defined by the challenger first geographic location, the challenger second geographic location, and the challenger interim geographic locations at step step 414. One of either client mobile electronic device 360 or challenge record server 300 processes all of the location data accrued as a challenge is completed to extrapolate an estimated path that approximates the path that the challenger took when he completed a challenge. The path data may include digital representations of all of the recorded location data and may contain a significant amount of data.

Further, recording path data may create a significant strain on client mobile electronic device 360's battery life. As a result, some examples may forgo recording path data to reduce storage space. In such examples, challengers may merely travel from the first geographic location to the second geographic location without any requirement to travel on a specific path.

As FIG. 4 illustrates, the challenge data is communicated to a challenge record server at step 415. Typically, client mobile electronic device 360's software automatically communicates the challenge data to challenge record server 300 upon completing a challenge. FIG. 7-9 each show diagrammatic examples that illustrate cheat mobile electronic device 360 communicating with challenge record server 300 during operation. In some examples, client mobile electronic device 360 will communicate with challenge record server 300 regularly throughout operation through client mobile electronic device 360's network interface, such as through a cellular data network or through a WiFi connection. Typically, client mobile electronic device 360 interfaces with a network-connected daemon hosted on challenge record server 300 that processes and indexes the challenge data.

Although client mobile electronic device 360 typically communicates the challenge data to a remote challenge record server, client mobile electronic device 360 may also include a local challenge record server that only indexes and stores challenges "dropped" on client mobile demonic device 360. Additionally or alternatively, this local challenge record server may index and store challenge data received from other nearby devices running method 400's software.

In some cases, client mobile electronic device 360 may not submit challenges until the challenger affirmatively chooses to do so. This allows challengers the ability to maintain some records confidential. Challengers may desire records to remain confidential, for example, when they achieve a poor result in a challenge and do not wish others to see the corresponding results.

As FIG. 4 illustrates, the challenger data is compared to an owner record to determine if the user was victorious over the owner in completing the server challenge at step 420. Typically, client mobile electronic device 360 requests challenge record server 300 to perform this comparison. Some example systems, however, may designate client mobile electronic device 360 to perform this comparison (to reduce the server's processor load, for example).

As FIG. 3 illustrates, challenge record server 300 includes an owner record 330 in each server challenge dataset 304. After communicating a challenger record 320 to challenge record server 300, client mobile electronic device 360 requests challenge record server 300 to compare the uploaded challenger record 320 to the owner record 330 associated with the challenge to which challenger record 320 corresponds.

Challenge record server 300 may implement a variety of methods in determining whether the challenger is victorious over the owner. In some cases, challenge record server 300 will compare the challenger's completion time with the owner record's completion time. If the challenger completed the challenge with a shorter completion time than the current completion time recorded in the owner record, the challenger is victorious over the owner. Client mobile electronic device 360, as displayed in FIG. 8, illustrates an example wherein challenger 362 was victorious based on this method. When the challenger is victorious, challenge record server 300 will overwrite the corresponding owner record 330, as described above.

In examples that don't define a simple running race, however, the challenge record server may use other criteria to determine whether the challenger is victorious. For example, victory may be defined by travelling the longest distance from a certain starting point. In other examples, such as those relating to non-timed events, points may be recorded, and victory may be defined by either the highest or lowest score.

In some examples, challenge record server 300 may compare the challenger's path to the owner's path in determining whether the challenger was victorious. In many such examples, the challenger may be required to follow a substantially similar path to the one defined by the owner record.

As FIG. 4 illustrates, the challenge record server is requested to overwrite the owner record if the challenger was victorious. Upon receiving the request, the challenge record server overwrites the owner record compared to the challenger record at step 420. In some cases, the challenge record server may store the data contained in the previous owner record in a server challenge record to maintain a record of the previous owner's challenge activities.

Some examples may allow anonymous challengers and/or owners. When both the challenger and owner are anonymous, neither the challenger record nor the owner record will include identity data. Some examples may allow both anonymous and identified records; in these cases, anonymous challenger data may overwrite identified owner data, and vice versa.

As FIG. 4 shows, the computing device produces a notification that the challenger was victorious at step 430. FIG. 8 illustrates an example of a graphical notification, graphical notification 377, produced on client mobile electronic device 360's display unit. Notifications may often be graphical, and client mobile electronic device 360 may produce other types of notifications, such as audio or textual notifications. Further, client mobile electronic device 360 may communicate notifications toward third parties by, for example, sending text messages, e-mails, or social media postings.

As FIG. 4 illustrates, a graphical display is displayed on the display unit at step 435. Displaying on the display unit a graphical display may include, at times, displaying a map at step 437, displaying a trace on the map corresponding to an owner path at step 439, displaying a challenger location symbol at step 441, and displaying an owner location symbol at step 443.

As FIG. 4 shows, a map is displayed on the display unit at step 437. FIGS. 7 and 9 illustrate examples of maps, map 371*i* and map 371*ii*, each displayed on client mobile electronic device 360. As FIGS. 7 and 9 show, each map is focused on a geographic region proximate challenger 362's current challenge. Challengers may also be able to manipulate the map to focus on other geographic locations to search for challenges in other geographic regions.

As FIG. 4 illustrates, a trace corresponding to a path is displayed on the map at step 439. FIG. 7 illustrates a challenger trace 373 corresponding to the record of the challenge in which challenger 362 is currently attempting displayed on map 371*i*. Challenger trace 373 illustrates challenger 362's path on the current challenge. In some examples, client mobile electronic device 360 will extend challenger trace 373 as a challenger completes a challenge. FIG. 9 additionally illustrates a plurality of owner traces 372 corresponding to owner records on map 37*ii*. The owner traces 372 that correspond to owner records 330 on challenge record server 300. Owner traces 372 allow challengers to view nearby challenges to attempt, while providing a visual estimate of their length and path.

As FIG. 4 shows, a challenger location symbol corresponding to a challenger current location received from the location sensing device is displayed at step 441. FIG. 9 illustrates an example of a challenger location symbol, challenger location symbol 374, displayed on map 371*ii*. Challenger location symbol 374 shows the current location of challenger 362 and provides a visual cue as to his progress in completing the challenge.

As FIG. 4 shows, an owner location symbol is displayed on the map at step 443. FIG. 9 illustrates an example of an owner location symbol displayed on map 371*ii* owner location symbol 375. As FIG. 9 shows, owner location symbol 375 is displayed on challenger trace 373. Owner location symbol 375 is a location that corresponds to the position the owner would be expected to be in the challenge if he started at the same time as challenger 362. This owner expected location is calculated by computing a pace using the first geographic location, second geographic location, and completion time, and then computing how far the owner would have traveled by the current time according to his pace.

Figure 5:
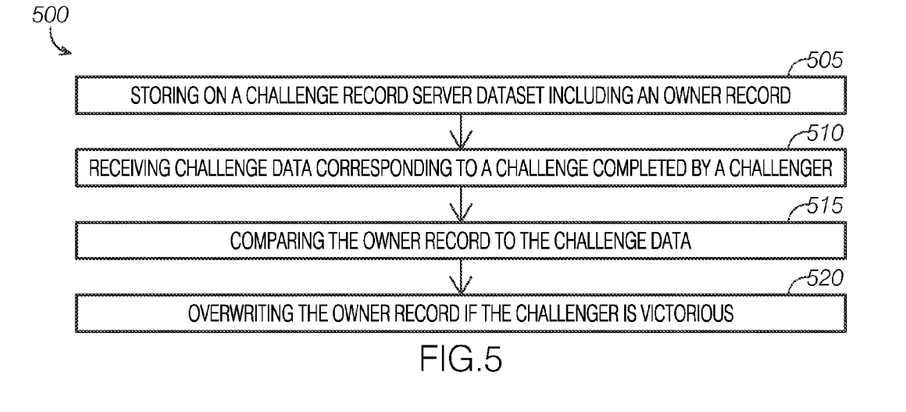
FIG. 5 is a flow diagram of a second example of a method for sharing athletic activities.

With reference to FIG. 5, an example of a method for storing athletic activity on a computing device, method 500, will now be described. As FIG. 5 illustrates, method 500 includes storing on a challenge record server a server dataset including an owner record at step 505, receiving challenge data corresponding to a challenge completed by a challenger at step 510, comparing the owner record to the challenge data at step 515, and overwriting the owner record if the challenger was victorious at step 520. Method 500 includes many similar or identical features to method 400. Rather than exhaustively describe each and every feature, this disclosure points to earlier described features that are substantially similar to features of method 500.

In the example shown in FIG. 5, challenge record server 300 performs the steps of method 500 in concert with client mobile electronic device 360 performing the steps of method 400. Typically a challenger participates in a challenge as client mobile electronic device 360 logs data corresponding to the challenge and communicates it to challenge record server 300. Challenge record server 300 performs the steps of method 500 upon receiving the data to index and store the challenger data.

As FIG. 5 illustrates, a server dataset is stored on a challenge record server at step 505. Typically, the server datasets are substantially similar to server challenge datasets 304 shown in FIG. 3. Though the data is often organized in a manner similar to the one diagrammed in FIG. 3, it may be organized in other configurations.

As FIG. 5 illustrates, challenger data corresponding to a user challenge completed by a challenger is received through a network interface at step 510. This may occur in concert with client mobile electronic device 360 performing step 415. In a typical example, challenge record server 300 receives challenger records communicated by client mobile electronic device 360 as challenger 362 completes challenges. Upon receiving the challenger data, challenge record server 300 indexes and stores it in an appropriate server challenge dataset.

As FIG. 5 shows, an owner record is compared to the challenger data to determine if the challenger was victorious at step 515. Step 515 may occur in response receiving challenger data or in response from client mobile electronic device 360, such as in step 420. Examples of potential bases for comparing the challenger data to the owner record are discussed above, and will not be redundantly described here.

As FIG. 5 illustrates, the owner record is overwritten if the challenger is victorious at step 520. Typically, this occurs automatically upon determining whether the challenge was victorious or in response to a request from client mobile electronic device 360. If challenge record server 300 determines that the challenger is victorious, it may overwrite the corresponding owner record and save the data in the overwritten owner record as a server challenge record in the appropriate server challenge dataset.

Figure 6:
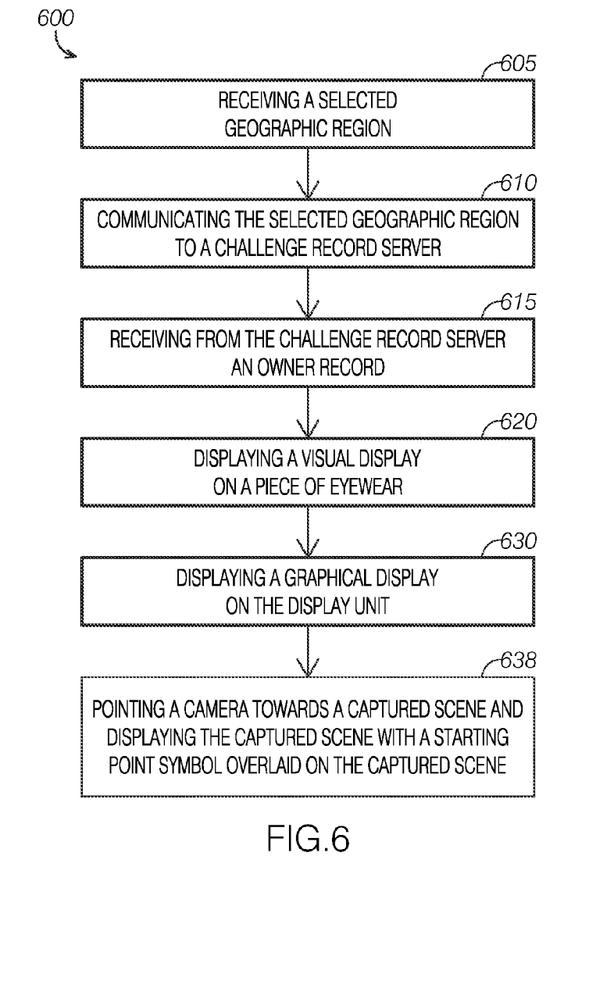
FIG. 6 is a flow diagram of a third example of a method for sharing athletic activities.

With reference to FIG. 6, an example of a method for receiving athletic activity data on a computing device, method 600, will now be described. As FIG. 6 illustrates, method 600 includes receiving a selected geographic region at step 605, communicating the selected geographic region to a challenge record server at step 610, receiving from the challenge record server an owner record at step 615, displaying a visual display on a piece of eyewear at step 620, and displaying a graphical display on a display unit of a client computing device at step 630. Method 600 includes many similar or identical features to method 400. Rather than exhaustively describe each and every feature, this disclosure points to earlier described features that are substantially similar to features of method 600.

Client mobile electronic device 360 may perform the steps of method 600 and is configured to operate in concert with a challenge record server 300 hosting data, including owner records, related to nearby challenges. In some examples, client mobile electronic device 360 performs the steps of method 600 as a challenger searches for available challenges proximate a selected geographic region with device 360.

As FIG. 6 shows, a selected geographic region is received from an input device at step 605. In the example shown in FIG. 6, client mobile electronic device 360 automatically selects the selected geographic region with by using the location sensing device to determine its current location. The selected geographic region typically includes an area around the current location. In many cases, the selected geographic region may be defined by the bounds of a map displayed on client mobile electronic device 360. Challengers may manually select a geographic region by manipulating the displayed map or manually entering geographic data (such as a city, state, zip code, address, etc.).

FIG. 8 displays an alternative method of selecting a selected geographic region that may be particularly useful in augmented reality-type configurations. FIG. 8 shows client mobile electronic device 360 pointing a camera toward a captured scene and displaying the captured scene on the display unit. As FIG. 8 illustrates, the bounds of the selected geographic region are defined by the extent of the captured scene. FIG. 8 illustrates visual display features that reflect these bounds. In some cases, a clipping distance may be set, either automatically by client mobile electronic device 360 or a manually by a challenger. This may be useful to limit the selected geographic region to areas that the challenger can see.

As FIG. 6 illustrates, the selected geographic region is communicated to a challenge record server at step 610. Typically, client mobile electronic device 360 communicates the selected geographic region to a challenge record server. This allows the challenge record server to provide location-specific services to the client device. In many cases, challenge record server 300 will respond to receiving the selected geographic region by transmitting a collection of challenges that begin or end within the selected geographic region (or simply their associated owner records).

As FIG. 6 shows, an owner record is received from the challenge record server at step 615. As previously discussed, challenge record server 300 typically sends data corresponding to one or more challenges near the challenger in response to receiving a selected geographic region. In some examples, challenge record server 300 sends the owner record associated with each challenge at this point. In some cases, challenge record server 300 may additionally or alternatively send each server challenge record associated with the nearby challenges, providing challenger with more data telling ho previous challengers fared in the nearby challenge.

As FIG. 9 illustrates, a visual display is displayed on a piece of eyewear, such as eyewear 380, at step 620. Although challenger 362 is not displayed in FIG. 9, eyewear 380's illustrated configuration is designed to be worn by challenger 362 while participating in a challenge. As FIG. 6 shows, the visual display may include a starting point symbol, an owner path, and a virtual human figure.

FIG. 9 illustrates an example of a visual display, visual display 381, displayed on eyewear 380. As FIG. 9 shows, eyewear 380 includes a partially transparent screen 395 at least partially disposed within challenger 362's field of vision 399. Eyewear 380 displays information related to the present challenge to challengers as they are participating in a challenge. In some examples, eyewear 380 may include a camera or location sensing devices that may be used to select a selected geographic region.

Visual display 381 provides challenger 362 with a display that remains seated in his field of vision while completing a challenge. As a result, challenger 362 is able to scan nearby challenges and view his progress versus a challenge's owner without accessing an additional device.

FIG. 9 illustrates an example wherein visual display 381 includes a starting point symbol, starting point symbol 382, displayed on eyewear 380. As FIG. 9 shows, starting point symbol 382 is overlaid in challenger 362's field of vision to give him the appearance that starting point symbol 382 is displayed at the owner first geographic location. Starting point symbol 382 allows challenger 362 to guide himself to the starting point of the challenge without shifting his vision to a separate device.

Although the illustrated starting point symbol is somewhat basic, starling point symbols may, in some examples, include additional data about the starting point, such as the owner of the corresponding challenge, the length of the challenge, the owner's completion time, or other relevant information stored by challenge record server 300. As FIG. 9 shows, the visual display may additionally include a challenge drop icons 368, which the challenger may select to initiate or begin a challenge.

FIG. 9 illustrates an example wherein visual display 381 includes a virtual trail 384 associated with an owner record path associated with the owner record. As FIG. 9 shows, virtual trail 384 serves as a navigational tool for challenger 362 to follow to follow the path of the challenge. As FIG. 9 shows, virtual trail 384 is overlaid over the challenger's field of vision as he continues along the challenge's path, providing a simple navigational tool.

FIG. 9 illustrates an example wherein visual display 381 includes a virtual human figure 386 positioned and sized to give challenger 362 the appearance of an owner's expected location in the challenge had the owner begun the challenge at the same time as challenger 362. The owner's expected location is computed from the owner first geographic location, the owner second geographic location, the owner completion time, and the time elapsed since challenger 362 began the challenge.

In some examples, virtual human figures are displayed in the challenger's field of vision only when a user is trailing the owner's pace, serving as a motivational tool for the challenger to catch up. In other examples, the human figure is constantly displayed. Virtual human figures need not correspond to an owner record in all examples; in some examples, virtual human figures may be associated with selected server challenge records.

As FIG. 7-9 illustrate, a graphical display is displayed on the display unit of the client computing device at step 630. Graphical display 363i and graphical display 363ii illustrated on FIGS. 8 and 9, respectively, provide examples of such displays.

As FIG. 9 shows, the graphical display may include map 371ii that displays the selected geographic region. As FIG. 9 shows, the graphical display may additionally include one or more beginning location symbols 367 on the map near the starting positions associated with owner records received from the challenge record server. FIG. 9 further illustrates challenger first location symbol 365 associated with the starting position of the challenge in which challenger 362 is presently participating.

As FIG. 9 shows, the graphical display may include one or more additional or alternative examples of challenge drop icons 368 positioned proximate beginning location symbols 367, which challenger 362 may select to begin the corresponding challenge. The graphical display may additionally include a plurality of challenge end symbols 376 opposite beginning location symbols 367 to display the location the corresponding challenge ends. These symbols and dialogs provide the challenger with a visual approximation of the location, length, and direction of nearby challenges, allowing the challenger to find and attempt them.

As FIG. 8 shows, a camera may be pointed toward a captured scene and the captured scene may be displayed on the display unit at step 638. Typically, client mobile electronic device 360 includes a camera facing the opposite direction as its display unit. As a result, client mobile electronic device 360 is able to provide a digital representation of a capture scene that encompasses a portion of the challenger's current visible range. When client mobile electronic device 360 is configured to capture a scene and provide a digital representation of if, it may display many visual display features, such as starting point symbol 382, over the digital representation. As FIG. 8 illustrates, many other aforementioned visual display and/or graphical display elements may be overlaid over the display of the captured scene on the display unit.

The disclosure above encompasses multiple distinct inventions with independent utility. While each of these inventions has been disclosed in a particular form, the specific embodiments disclosed and illustrated above are not to be considered in limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A method for sharing athletic activity data on a computing device, the computing device including a display unit, system memory, a network interface, and input devices including a timekeeping device and a location sensing device, the method comprising:
   receiving challenger data from an input device corresponding to a challenge initiated by a challenger, where receiving challenger data includes:

detecting challenger first location data with the location sensing device, the challenger first location data corresponding to a challenger first geographic location proximate the location that the challenger begun the challenge;

detecting challenger second location data with the location sensing device, the challenger second location data corresponding to a challenger second geographic location spaced from the challenger first geographic location;

detecting one or more challenger interim geographic locations between the challenger first geographic location and the challenger second geographic location; and defining a challenger path calculated from the challenger first geographic location, the challenger second geographic location, and the challenger interim geographic locations;

receiving completion time data from the timekeeping unit challenger, the completion time data corresponding to the time the challenger took to travel from the first geographic location to the second geographic location along the challenger path;

communicating to a challenge record server the challenger data;

comparing the challenger data to an owner record associated with an owner to determine if the challenger was victorious over the owner in completing the server challenge, the owner record included in a server challenge dataset hosted by the challenge record server and including an owner record first position entry including location data associated with an owner first geographic location proximate the challenger first geographic location, an owner second location entry including location data associated with an owner second geographic location, and an owner completion time entry; and requesting the challenge record server to overwrite the owner record with the challenger data if the challenger was victorious;

wherein the owner record includes an owner record path entry defining an owner path corresponding to the path that the owner took from the owner first geographic location to the owner second geographic location; and wherein the challenger is victorious only if the challenger path is consistent with the owner path.

2. The method of claim 1, wherein the challenger data includes challenger identity data distinctly identifying the challenger.

3. The method of claim 1, further comprising displaying on the display unit a graphical representation including:
a map; and
a challenger trace on the map corresponding to the challenger path; and
an owner trace on the map corresponding to the owner path.

4. The method of claim 1, further comprising producing a notification on the computing device confirming that the challenger is victorious.

5. The method of claim 1, further comprising:
displaying on the display unit a challenger location symbol corresponding to a challenger current location received from the location sensing device; and
displaying on the display unit an owner location symbol corresponding to an owner expected location computed from the owner first geographic location, the owner second geographic location, and the owner completion time.

6. A method for storing athletic activity on a computing device, the computing device including a storage unit and a network interface in data communication with a computer network, the method including:

storing on a challenge record server one or more server challenge datasets, wherein each server challenge dataset includes an owner record associated with an owner, the owner record including:

an owner record first position entry including location data associated with an owner first geographic location;

an owner record second location entry including location data associated with an owner second geographic location spaced from the owner first geographic location;

an owner path entry including location data associated with an owner path, the owner path defined by the collection of the owner first geographic location, the owner second geographic location, and one or more geographic locations the owner traveled between the owner first geographic location and the owner second geographic location; and an owner record completion time entry including completion time data corresponding to the time it took the owner to travel from the owner first geographic location to the owner second geographic location along the owner path;

receiving challenger data through the network interface, challenger data corresponding to a challenge completed by a challenger;

comparing the owner record to the challenger data to determine if the challenger was victorious, the challenger being victorious if:

the challenger data includes challenger first location data consistent with the owner first position entry;

the challenger data includes challenger second location data consistent with the owner second location entry;

the challenger data includes interim location data corresponding to one or more challenger interim geographic locations between the challenger first geographic location and the challenger second geographic location, the challenger first location data, the challenger second location data, and the one or more challenger interim geographic locations collectively defining a challenger path;

the challenger data includes challenger completion time data corresponding to a smaller duration of time than the owner record completion time, the challenger completion time data corresponding to the time it took the challenger to travel along the challenger path, where the challenger path is substantially consistent with the owner path; and overwriting the owner record if the challenger is victorious.

7. The method of claim 6, wherein:
the owner record includes an owner identity entry including owner identity data distinctly identifying the owner;
the challenger data includes challenger identity data distinctly identifying the challenger;
overwriting the owner record includes overwriting the owner identity data with the challenger identity data.

8. A method for receiving athletic activity data on a computing device, the computing device including a display unit, system memory, input devices, and a network interface, the method including:
receiving from the input devices a selected geographic region;
communicating the selected geographic region to a challenge record server via the network interface; and receiving from the challenge record server an owner record, the owner record associated with an owner of a challenge within the selected geographic region and including:
an owner record first position entry including location data associated with an owner first geographic location;
an owner record second location entry including location data associated with an owner second geographic location spaced from the owner first geographic location;
an owner path entry including location data associated with an owner path, the owner path defined by the collection of the owner first geographic location, the owner second geographic location, and one or more geographic locations the owner traveled between the owner first geographic location and the owner second geographic location; and
an owner record completion time entry including completion time data corresponding to the time it took the owner to travel from the owner first geographic location to the owner second geographic location along the owner path;
receiving challenger data through the network interface, challenger data corresponding to the challenge completed by a challenger; and
comparing the owner record to the challenger data to determine if the challenger was victorious, the challenger being victorious if:
the challenger data includes challenger first location data consistent with the owner first position entry;
the challenger data includes challenger second location data consistent with the owner second location entry;
the challenger data includes interim location data corresponding to one or more challenger interim geographic locations between the challenger first geographic location and the challenger second geographic location, the challenger first location data, the challenger second location data, and the one or more challenger interim geographic locations collectively defining a challenger path; and
the challenger data includes challenger completion time data corresponding to a smaller duration of time than the owner record completion time, the challenger completion time data corresponding to the time it took the challenger to travel along the challenger path, where the challenger path is substantially consistent with the owner path.

9. The method of claim 8, wherein:
the input devices include a location sensing device configured to provide a challenger current location; and
the selected geographic region includes the challenger current location.

10. The method of claim 8, wherein the display unit includes a piece of eyewear to be worn by the challenger with a partially transparent screen at least partially disposed within the challenger's field of vision; and
further comprising displaying on the screen a visual display incorporating data from the owner record.

11. The method of claim 10, wherein the visual display includes a starting point symbol overlaid in the challenger's field of vision to display the starting point symbol in the challenger's field of vision proximate the owner first geographic location.

12. The method of claim 10, wherein:
the visual display includes a virtual trail positioned to display a virtual representation of the owner path in the challenger's field of vision.

13. The method of claim 10, wherein:
the visual display includes a virtual human figure positioned and sized to give the challenger an appearance of the owner being located at an owner expected location computed from the owner first geographic location, the owner second geographic location, the owner completion time, and the time elapsed since beginning the challenge.

14. The method of claim 8, further comprising displaying on the display unit a graphical display associated with the owner record, wherein the graphical display includes:
a map; and
a beginning location symbol a position on the map associated with the owner first geographic location.

15. The method of claim 14, wherein:
displaying the graphical display includes displaying an owner position symbol on the map proximate a current owner position determined by the completion time data.

16. The method of claim 8, further comprising displaying on the display unit a graphical display associated with the owner record, wherein:
the input devices include a camera; and
displaying the graphical display includes:
pointing the camera towards a captured scene; and
displaying on the display unit the captured scene and a challenge drop icon overlaid on the captured scene proximate the owner first geographic location in the challenger's field of vision.

17. The method of claim 8, further comprising initiating the challenge in response to selecting a challenge drop icon.

18. The method of claim 8, further comprising:
receiving one or more server challenge records from the challenge record server, each server challenge record:
corresponding to a server challenge; and
including a server challenge first geographic location entry including data corresponding to a first server challenge geographic location; and
displaying on the display unit a graphical representation of one or more of the server challenge records within the selected geographic region.

* * * * *